March 27, 1962   C. S. GALTZ ET AL   3,027,472
MAGNETIC COUPLING ARRANGEMENT
Filed April 11, 1958   2 Sheets-Sheet 1
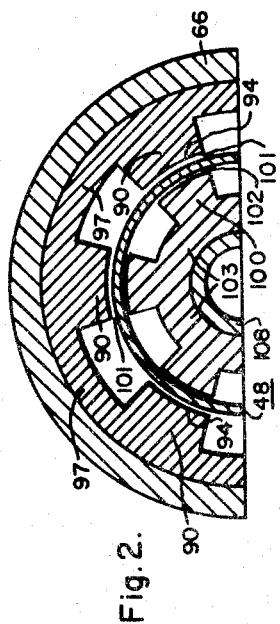
Fig. 2.
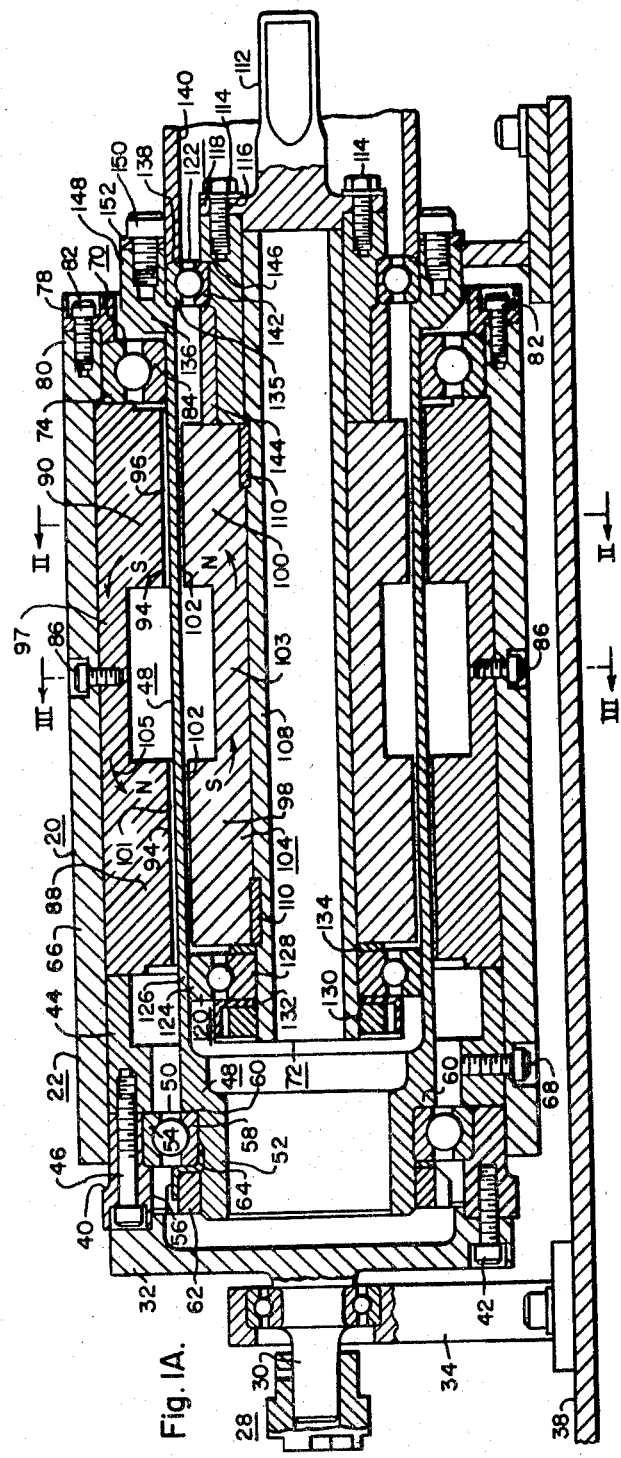
Fig. IA.

March 27, 1962 C. S. GALTZ ET AL 3,027,472
MAGNETIC COUPLING ARRANGEMENT
Filed April 11, 1958 2 Sheets-Sheet 2
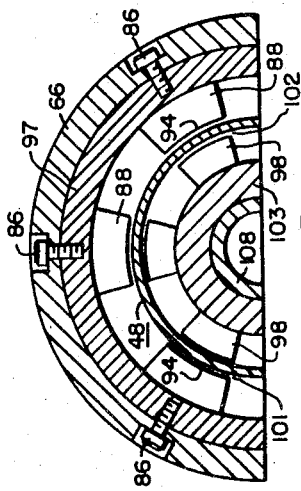
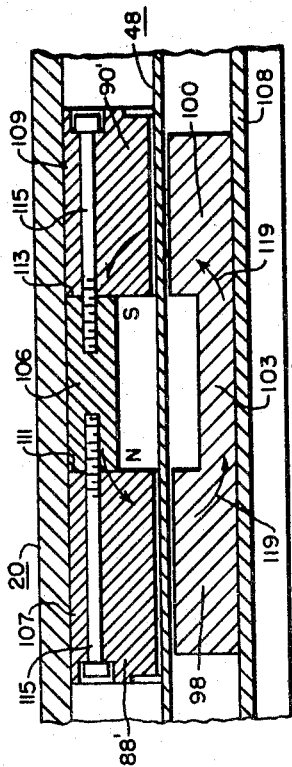
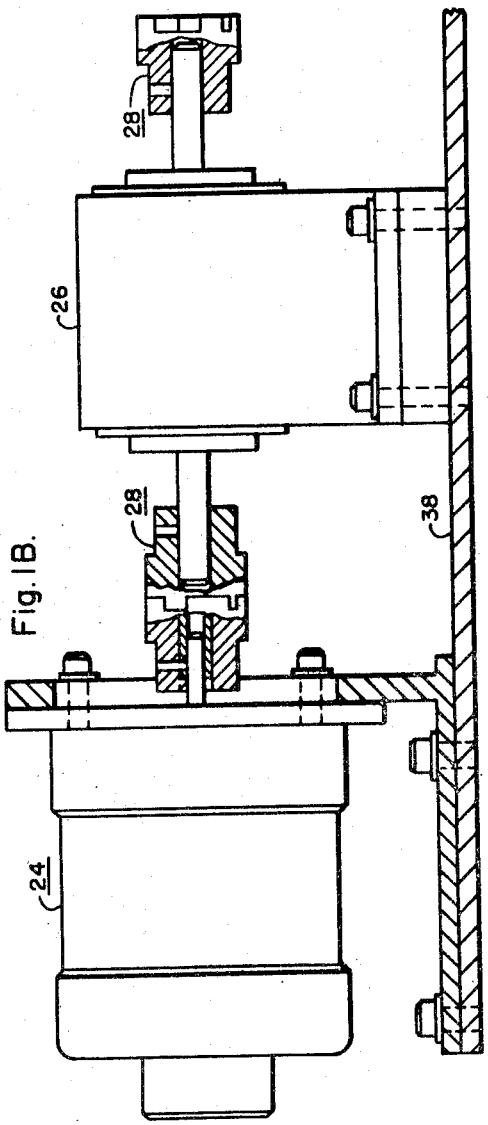
WITNESSES:
Bernard R. Gieguay
Robert C. Baird
INVENTORS
Charles S. Galtz and
Dikran A. Guerdan.
BY Donald Smith
ATTORNEY

United States Patent Office 3,027,472
Patented Mar. 27, 1962

3,027,472
MAGNETIC COUPLING ARRANGEMENT
Charles S. Galtz, Pittsburgh, and Dikran A. Guerdan, Churchill, Pa., assignors to Westinghouse Electric Corporation, East Pittsburgh, Pa., a corporation of Pennsylvania
Filed Apr. 11, 1958, Ser. No. 727,915
5 Claims. (Cl. 310—104)

The present invention relates to a magnetic coupling arrangement, and particularly to one wherein the driven component is adapted for sealing within an enclosed system.

There are many applications wherein it is desired to drive a movable component such as a pump impeller, a mixing agitator, the rotor of a telemetering device, or a lead screw for actuating a valve or other element arranged for controlling a system. These driven components frequently are sealed within a system in which the characteristic of zero leakage therefrom is specified. When handling certain hazardous fluids, for example, it is essential to avoid any possibility of contact therewith by operating personnel. In such arrangements, it is virtually impossible to extend a driving shaft or the like into the system due to the inevitable leakage, although slight, characteristic of various sealing arrangements or packing glands or the like, particularly after being subjected to a period of wear. The problem of driving a component which is hermetically sealed within the system is complicated still further in those applications wherein the system is maintained at extremely high pressures or is comprised of highly corrosive or erosive fluids which, of course, greatly accelerate the wear and deterioration to which the aforementioned sealing arrangements are vulnerable.

In the aforementioned applications, direct mechanical coupling can be avoided between the driving and driven components by fabricating these components from magnetic materials and by providing at least one of these components with a permanent or an electromagnetic arrangement in order to induce magnetic coupling between the components. Although numerous magnetic coupling arrangements have been proposed heretofore, these arrangements for the most part are unable to withstand the application of sufficient driving torque as to render these prior magnetic couplings useful in many of the aforesaid applications. This defect is augmented particularly in those arrangements subjected to high pressures wherein a pressurized container or barrier necessitates a relatively large separation between the driving and driven components of the magnetic couplng.

In previously proposed magnetic couplings, particularly those using permanent magnets, the insufficient driving torque thereof frequently resulted from the fact that the confronting surfaces of the magnetic poles associated with the driving and driven components of the coupling has been made relatively small due to the physical or spatial arrangement of these poles. Moreover, these prior arrangements quickly lost their magnetism when the driving and driven members were dismantled for repair, replacement or other maintenance. Accordingly, when the components were separated in this fashion, it was necessary to remagnetize these components after reassembly of the magnetic coupling.

In one aspect of the invention, the physical structure thereof is arranged such that a peremanent magnet material can be utilized which does not readily lose its magnetism and whose energy product is somewhat lower. In an exemplary form of the invention, the permanent magnets thereof are fabricated from a ceramic material such as Indox V made by Indiana Steel Products Company, which retains its magnetism even when the component parts of the magnetic couplings are disassembled. The energy product of the aforesaid ceramic material is somewhat lower than the best permanent magnet material Alnico V, and is found from the following relationship:

$$B_d H_d(\text{max.}) = \text{energy product}$$

where, $B_d$ is the operating flux density in gausses, and $1H_d$ is the demagnetizing force in oersteds.

Although the flux density of the aforementioned ceramic material is somewhat lower than the Alnico V material, the major component of its energy product is the term $H_d$ which is several times greater than that of the best of the usual magnetic materials. In order to use this ceramic material efficiently, then, the magnetic coupling of the invention is constructed in such a manner as to afford a large area of confrontng pole surfaces and a relatively short length of magnet in the direction of magnetism. However, it will be apparent as this description proceeds that any of the usual magnetic materials can be utilized for fabricating the driving and driven members of the coupling with the attendant advantage of increased torque, in those applications wherein the loss of magnetism occasioned when decoupling the coupling does not present a serious problem or wherein the magnetic coupling is rarely disassembled.

In view of the foregoing, this invention contemplates a novel and efficient magnetic coupling arrangement.

Another object of the invention is the provision of a magnetic coupling having a minimum of component parts and adapted for application of relatively high torque without loss of synchronism between the driving and driven components of the coupling.

A further object of the invention is the provision of a magnetic coupling arrangement wherein a novel magnetic pole arrangement is employed.

Still another object of the invention is to provide a magnetic coupling with novel means for facilitating magnetic fluxile paths between the driving and driven components thereof.

A still further object of the invention is to furnish a novel magnetic coupling arrangement which is capable of operating with a relatively thick, sealed enclosure inserted between the driving and driven components thereof.

Yet another object of the invention is the provision of a magnetic coupling adapted for the use of permanent magnets but equally adaptable for employment of an electromagnetic arrangement, if desired.

Another object of the invention s the provision of a magnetic coupling having novel structures associated therewith for increasing the confronting area of the salient magnetic poles thereof.

Still another object of the invention is the provision of a magnetic coupling wherein the operating torque thereof is increased through the use of relatively large confronting pole areas and a relatively short length of magnet in the direction of magnetism.

A further object of the invention is the provision of a permanent magnet coupling having novel structure associated therewith adapted to permit usage of a magnetic material having a somewhat lower energy product but having a relatively higher demagnetizing force.

These and other objects, features and advantages of the invention will be exemplified more fully during the forthcoming description of an illustrative form of the invention, with the description being taken in conjunction with the accompanying drawings, wherein:

FIGURES 1A and 1B are bipartite longitudinal views, partially in section, of one form of a magnetic coupling arrangement assembled in accordance with the present invention;

FIG. 2 is a partial cross-sectional view showing the magnetic coupling of FIG. 1A and taken along reference lines II—II thereof;

FIG. 3 is a partial cross-sectional view depicting the magnetic coupling of FIG. 1A and taken along reference lines III—III thereof; and FIG. 4 is a partial, longitudinally sectioned view of another form of magnetic coupling constructed pursuant to the invention.

In accordance with the invention, a driven component or rotor is arranged for sealing within an enclosed or hermetically sealed housing and is further arranged for rotation under the influence of a rotating field or driving member mounted externally of the housing. In an exemplary form of the invention, the rotating field comprises a permanent magnet having a plurality of pole extensions and mounted for rotation upon the external surface of the sealed rotor housing. These pole extensions are arranged to cooperate with opposing pole projections, respectively, which are secured to the rotor within the sealed housing. The driving and driven member and the pole extensions are further arranged so that the magnetic paths through these components are relatively short in the direction of magnetism. Because of the novel configuration of these magnets and pole pieces, a considerable amount of torque can be applied to the magnetic coupling without disrupting synchronism between the driving and driven components thereof.

Referring now more particularly to the drawings, the illustrative form of invention exemplified therein comprises a magnetic coupling arrangement indicated generally by the reference character 20, the rotating field structure 22 of which is adapted to be rotated in this example at a relative slow speed by a suitable driving mechanism, for an example, an electric motor 24. The motor 24 is coupled to a reduction gearing arrangement indicated generally by the reference character 26, through a conventional and mechanical coupling 28. The reduction gearing arrangement 26 in turn is coupled to the rotating field structure 22 through another conventional coupling denoted generally by the reference character 28. In furtherance of this purpose the field structure 22 is secured to and is supported by a driving shaft 30 by means of a bell-shaped bracket 32. The driving shaft 30 is mounted for rotation within a supporting bracket 34 through the use of suitable antifrictional means, for example, the ball-bearing arrangement 36. The supporting bracket 34, together with the electric motor 24 and the reduction gearing arrangement 26, is secured to a suitable bed or base member 38 with the use of various mounting bolts as indicated in the drawings.

The bell-shaped bracket 32 in this example is secured to an annular bearing housing 40 by means of a plurality of mounting bolts, one of which is denoted by the reference character 42. The bearing housing 40 in turn is mounted upon a spacing ring 44 through the use of additional mounting bolts 46. The bell bracket 32, the bearing housing 40 and the spacing ring 44 are mounted for rotation upon a sealed rotor enclosure 48. In furtherance of this purpose, suitable antifrictional means, for an example, a ball-bearing arrangement 50, is mounted between the bearing housing 40 and a tubular extension 52 of the rotor enclosure 48. The outer race 54 of the ball-bearing 50 is secured between the spacing ring 44 and an inwardly extending shoulder 56 provided at the inner periphery of the bearing housing 40. On the other hand, the inner race 58 of the ball-bearing 50 is secured against an outwardly extending shoulder 60 formed upon the outer surface of the rotor housing extension 52. When thus positioned, the inner race 58 is secured against the shoulder 60 by means of an annular locking nut 62 and a lockwasher 64. The inner periphery of the locking nut 62 is tapped or threaded as is the adjacent outer periphery of the tubular housing extension 52.

To the spacing ring 44 a tubular supporting sleeve 66 is secured, desirably in coaxial relationship by means of a plurality of cap screws, with one of the screws being denoted by the reference character 68. The supporting sleeve 66 is furnished for the purpose of supporting the field magnet arrangement presently to be described and is rotatably mounted adjacent its other end upon suitable antifrictional means, for an example, the ball-bearing 70, likewise secured to the rotor enclosure 48. For purposes hereinafter elaborated upon, the supporting sleeve 66 extends substantially along the entire length of the driven component or rotor 72 of the magnetic coupling. The outer race 74 of the ball-bearing 70 is secured between one end of a field magnet 76 presently to be described and a bearing retaining ring 78. The bearing ring 78 is secured to the outward end 80 of the supporting sleeve 66, that is to say, the end of the supporting sleeve which is remote from the driving shaft 30, by means of a plurality of mounting screws 82. The inner race 84 of the ball-bearing 70 is slidably mounted upon the exterior surface of the rotor enclosure 48. With this arrangement then, it will be seen readily that the rotating field structure 22 can be removed easily from the rotor enclosure 48 by disengaging the annular locking nut 62 and the associated lockwasher 64 from the tubular housing extension 52 and thereafter withdrawing the field structure 20 including the ball-bearings 50 and 70 from the rotor housing 48.

To the inner periphery of the supporting sleeve 66 is secured the aforementioned field magnet 76, which as indicated heretofore, abuts against the spacing ring 44 at one end thereof and against the outer ring 74 of the ball-bearing 70 at its opposite end. The field magnet 76 is secured to the supporting sleeve 66 by means of a plurality of mounting screws 86 which are spaced around the circumferential periphery of the sleeve 66. As better shown in FIGS. 2 and 3 of the drawings, the field magnet 76 is furnished with a generally tubular configuration and in this arrangement is fabricated from the ceramic material, Index V, mentioned previously or from some other suitable and known magnetic material, such as Alnico V.

Adjacent each end of the field magnet 76, a plurality of pole extensions 88 and 90 are formed. Desirably, the pole extensions 88 and 90 are fabricated integrally with the field magnet 76 and extend inwardly from the bore 92 thereof. In this exemplification, each group of pole extensions 88 or 90 numbers six, which are spaced evenly about the inner periphery of the field magnet 76. The inward ends of each pole extension 88 or 90 is provided with a concave cylindrical configuration 94, as better shown in FIGS. 2 and 3, so that these ends are set relatively closely with the outer surface of the cylindrical rotor housing 48. However, sufficient gap 96 is left between the pole extensions 88 and 90 and the outer surface of the rotor housing 48 to allow for manufacturing tolerances and for free rotation of the field magnet 76 and associated components. The pole extensions 88 and 90 are made relatively broad in the longitudinal direction in the magnetic coupling 20, in order to afford a relatively short length 98 of the field magnet 76 between each group of pole extensions 88 and 90.

The field magnet 76 is permanently magnetized so that each group of pole extensions 88 or 90 is of the same polarity. For example, the pole extensions 88 are of north polarity while the pole extensions 90 are of south polarity as better shown in FIG. 1A of the drawings. These pole extensions cooperate with similar pole extensions of the rotor 72 as described presently.

In those applications wherein the rotor 72 is employed within a highly pressurized sealed system (not shown) the rotor housing 48 which communicates with the system is formed with a thickness sufficient to withstand the operating pressures developed within the system. In the case of highly pressurized systems wherein the rotor enclosure 48 is, of course, relatively thick, the enclosure desirably is fabricated forming semi-magnetic material, that is, one of low or intermediate permeability such as hardened 410 (A.I.S.I.) stainless steel having 11½ to 13½% chromium. This material will avoid longitudinally short circuiting any substantial amount of magnetic flux between the groups of pole extensions 88 and 90, and also will avoid flux-smearing between adjacent ones of each group of pole extensions, but yet will permit adequate flow of magnetic flux through the rotor enclosure 48 in a radial direction, that is to say, between the pole extensions 88 and 90 and related pole extensions respectively, of the rotor 72. Suitable semi-magnetic enclosures for this purpose are described and claimed in the copending application of M. E. McCown, entitled "Electric Motor Device," Serial No. 496,832, filed March 25, 1955, and assigned to the present assignee.

In this arrangement, the rotor 72 similarly is provided with groups of magnetic pole extensions 98 and 100. The extensions 98 and 100 are formed adjacent the ends respectively of the rotor 72 in the example and likewise can be formed integrally with the outer tubular sleeve 104 of the rotor. Each group of rotor poles 98 or 100 in this example are six in number but in any event are equivalent in number to that of the field magnet extensions 88 or 90. Mounted upon the outer surface of the sleeve 104, the rotor pole extensions 98 and 100 likewise are equally spaced about the outer periphery of the rotor 72 and thus are juxtaposable to the field magnet pole extensions 88 and 90, respectively.

The rotor extensions 98 and 100 are provided at their outward ends with convexed cylindrical surfaces 102, as better shown in FIGS. 2 and 3, in order to seat relatively closely within the cylindrical rotor housing 48 save for the necessary clearance 101 to permit rotation of the rotor 72. Each of the rotor extensions 98 and 100 likewise are relatively broad in the longitudinal direction of the magnetic coupling 20 and thus substantially coextend with the field magnet extensions 88 and 90, respectively, in order to afford a relatively large area of confronting pole extension surfaces 94 and 102. When arranged in this fashion, a relatively short connecting portion 103 of the rotor sleeve 104 exists between the rotor extensions 98 and 100 to afford a relatively short length of magnetic material in the magnetic fluxile paths.

In this modification, the rotor sleeve 104 can be magnetized such that its left end as viewed in FIG. 1A of the drawings is a south pole while the right end is a north pole. Thus, all of the pole extensions 98 and 100 are in fact south and north poles, respectively. Moreover the connecting portion 103 of the rotor sleeve 104 is of approximately the same length as that of the intermediate section 98 of the field magnet 76 so that the fluxile paths through the field magnets 76 and the rotor sleeve 104 are completed as indicated by arrows 105. In this arrangement, relatively large torque is obtained due to the proportionately large areas of confronting pole extension surfaces 94 and 102 of the field magnet 76 and the rotor 72, respectively. Moreover, the provision of a relatively short magnetic path between the pole extensions, as represented by the intermediate sections 98 and 103 of the field magnet 76 and the rotor sleeve 104 facilitates the flow of the magnetic flux and further increases the operating torque of the magnetic coupling 20. It will be appreciated that a larger number of the pole extensions 88, 90, 98 and 100 in each group thereof can be employed depending upon the size of the magnetic coupling and the operating torque desired. It will also be appreciated that the magnetic coupling 20 can be operated with only one of its driving and driven components having been magnetized. In the latter case, however, the outer or driving component 22 desirably is magnetized due to the relatively greater volume of its field magnet 76 as compared to the rotor sleeve 104. Obviously too, driving torque can be supplied if desired, to the rotor 72 so that the rotatable field 22 becomes the driven component of the coupling. The latter arrangement is useful in those applications wherein the rotor 72 is coupled to a valve or the like disposed within the aforesaid sealed system and operable by other means (not shown), in order to show the rotary position or some other characteristic thereof.

Referring now to FIG. 4 of the drawings, an illustrative arrangement of the invention is disclosed therein which is adapted for preferred use with a magnetic material having a relatively low energy product such as the ceramic material Index V described heretofore. Inasmuch as the flux density of this material is somewhat lower as compared to a signal magnetic material such as Alnico V, silicon steel or magnetic stainless steel. The length of this magnetic material, when utilized in the driving component 22 of the magnetic coupling, is minimized insofar as is feasible. The arrangement of FIG. 4 likewise is useful with an anisotropic magnetic material, such as Alnico V, which is capable of a much higher flux density in the direction in which permanent magnetization is induced. Therefore, bending of the magnetic flux paths through the integrally-formed pole extensions 88 and 90 of FIG. 1A is avoided. In furtherance of this purpose, the field magnet 76' of FIG. 4 is furnished at its intermediate section with a relatively short tubular magnet 106. The tubular magnet 106 is polarized such that its left and right ends in this arrangement of this invention as viewed in FIG. 4 are north and south poles respectively.

Adjacent these ends are mounted a pair of ring members 107 and 109, respectively. The ring members 107 and 109 are formed from a good magnetic material such as silicon steel, low carbon steel or annealed 410 stainless steel. The adjoining surfaces of the ring members 107 and of the tubular magnet 106 desirably are machined so that contiguous junctions 111 and 113 are formed therebetween. The ring members 107, 109 are secured in this position by mounting bolts 115 and therefore assume the magnetic polarity of the adjacent end of the tubular magnet 117. The ring members 107 and 109 are furnished with pole extensions 88' and 90' respectively, which serve the same function as the pole extensions 88, 90 of FIGS. 1A, 2 and 3. However, since the pole extensions 88' and 90' are formed on separate ring members 107 disposed laterally of the magnet 106, bending of the magnetic fluxile path occurs principally within the ring members 107 and their pole extensions. Thus, if the magnet 106 is formed from an anisotropic magnetic material as aforesaid, this characteristic is not detrimental because magnetic flux can flow in a straight path therethrough.

In the arrangement of FIG. 4, moreover, the length of magnetic path through the permanent magnet 117 is minimized as much as possible since the flux density thereof, when fabricated from the aforesaid ceramic material, is relatively low as compared to the ring members 107 and 109 including their pole extensions 88' and 90', respectively. The magnetic flux of the magnetic coupling of FIG. 4 thus follows the path denoted by arrows 119. It will be seen then that only a relatively small proportion of this path lies through the permanent magnet 106 and thus the effects of its relatively low flux density is minimized, with the major proportion of the flux path extending through material capable of relatively high flux density. In this latter arrangement, the rotor sleeve 104 desirably is not magnetized but is fabricated from one of the magnetic materials denoted heretofore in connection with the ring members 107 and 109.

Returning now to FIG. 1A, the rotor pole extensions 98 and 100 in this example as aforesaid, are formed integrally with the rotor sleeve member 104 which in turn is keyed to a tubular rotor shaft 108 by means of splines 110. The rotor sleeve member 104 together with the pole extensions 98 and 100 are fabricated from a magnetic material such as carbon steel but as stated previously, need not be permanently magnetized, in this example of the invention. On the other hand, in those applications wherein the rotor 72 is immersed within a corrosive fluid, the sleeve member 106 and the salient poles 104 can be fabricated from a magnetic stainless steel which desirably has been annealed to enhance its magnetic properties. To the tubular rotor shaft 108, which need not be necessarily fabricated from a magnetic material, is secured a shaft extension 112 by means of mounting bolts 114 inserted through suitable apertures 116 in a flanged portion 118 of the shaft extension and threaded into the outward end of the tubular rotor shaft 108.

The rotor 72 is mounted for coaxial rotation within the housing 48 by suitable antifrictional means, for example the ball-bearings 120 and 122. The outer race 124 of the ball-bearing 120 forms a relatively close fit with a raised surface portion 126 of the inner periphery of the enclosure 48, while the inner race 128 of the bearing 120 is secured by an annular locking nut 130 and lockwasher 132. The locking nut 130 is threaded upon the inner end of the tubular rotor shaft 108, and the inner race 128 of the bearing 120 is clamped between the locking nut and a spacing ring 134 inserted between the inner race 128 and the rotor sleeve 106.

Adjacent the opposite end of the rotor 72, outer race 135 of the bearing 122 is clamped between an inwardly extending shoulder 136 formed on the inner periphery of the rotor enclosure 48 and the inward end 138 of a rotor enclosure extension 140. The inner race 142 on the other hand is clamped between a bearing retaining ring 144 and an outwardly extending shoulder 146 formed adjacent the outward end of the tubular rotor shaft 108. In this manner then, the inner race 142 of the bearing 122, the bearing retaining sleeve 144, the rotor sleeve 106, the spacing ring 134, and the inner race 128 of the bearing 120 are clamped together in tandem along the length of the tubular rotor shaft 108 between the aforementioned shoulder 146 and the annular locking nut 130.

The rotor enclosure extension 140, which can communicate with a sealed system (not shown) as desired, is secured to a thickened outer end portion 148 of the rotor enclosure 48 by means of a plurality of cap screws 150 which are threadedly engaged with the end portion 148 and inserted through suitable apertures of an outwardly extending flange 152 secured to the housing extension 140. With this arrangement then, it will be apparent that the rotor 72 together with its component parts can be completely removed from the housing 48 simply by removing the enclosure extension 140 and withdrawing the rotor 72 longitudinally from the enclosure 48. Similarly, the component parts of the rotor 72 can be easily disassembled upon removing the annular locking nut 130. In applications involving extremely hazardous fluids wherein a zero leakage must be ensured, the housing extension 140 can be hermetically sealed to the rotor housing 48 through use of the sealing means disclosed and closed in Patent 2,805,789, entitled "Weld Container" issued to E. J. Kreh and C. M. Ladd on September 10, 1957, and assigned to the present assignee.

In view of the foregoing it will be apparent that a novel and efficient magnetic coupling arrangement has been exemplified herein. The descriptive illustrative materials employed for this purpose have been utilized solely for delineating the invention and thefeore should not be interpreted as limitative in nature. For example, a greater or lesser number of pole extension in the several groups 88, 90, 100 and 102 can be utilized depending upon the required operating torque. It will be obvious, then, that numerous modifications of the invention will occur to those skilled in the art without departing from the spirit and scope of the invention.

Accordingly, what is claimed as new is:

1. In a magnetic coupling, the combination comprising a tubular permanent magnet driving member having circumferential north and south magnetic poles disposed at its ends respectively, a plurality of pole extensions mounted upon the inner periphery of said driving member adjacent each of said ends, a driven member mounted for rotation within said tubular member, said driven member having a group of pole extensions mounted on the outer periphery at each end thereof, said driven member pole extensions being juxtaposable to said driving member pole extension, respectively, said permanent magnet driving member being formed from a magnetic material which will not become demagnetized when said driving member is separated from said driven member, and an enclosure disposed between said driving and driven member, said enclosure being formed from a material having an intermediate permeability.

2. In a magnetic coupling, the combination comprising an elongated tubular permanent magnet driving member having north and south magnetic poles disposed respectively at the ends thereof, a plurality of pole extensions joined to said driving member at each end thereof, said pole extensions extending longitudinally of said tubular member and inwardly thereof, an elongated driven member mounted for rotation within said driving member, a plurality of pole extensions formed at each end of said driven member at the outer periphery thereof, said last-mentioned pole extensions extending longitudinally of said driven member and substantially coextensively with said driving member extensions, said permanent magnet driving member being formed from a magnetic material which will not become demagnetized when said driving member is separated from said driven member, and an enclosure disposed between said driving and driven member, said enclosure being formed from a material having an intermediate permeability.

3. In a magnetic coupling, the combination comprising a tubular driving member, a tubular driven member, one of said members being mounted for rotation within the other, at least one of said members being at least in part a permanent magnet and having north and south magnetic poles disposed respectively at its ends, a plurality of pole extensions formed at each end of each of said members and extending toward the other of said members, the pole extensions of said driven member being juxtaposable respectively to the pole extensions of said driving member, said permanent magnet driving member being formed from a magnetic material which will not become demagnetized when said driving member is separated from said driven member, and an enclosure disposed between said driving and driven member, said enclosure being formed from a material having an intermediate permeability.

4. In a magnetic coupling adapted for use in conjunction with a sealed system, the combination comprising a sealed housing, a rotor mounted for rotation within said housing, a driving member mounted for rotation upon the outer surface of said housing at a position juxtaposed to said rotor, said driving member including a tubular permanent magnet having north and south magnetic poles disposed at its ends respectively, a plurality of pole extensions formed upon the inner periphery of said driving member adjacent each end thereof and protruding towards said sealed housing, a like plurality of pole extensions formed on the outer surface of said rotor adjacent each end thereof and protruding toward the inner wall of said housing, said rotor extensions being juxtaposable with said driving member extensions, respectively, said permanent magnet driving member being formed from a magnetic material which will not become demagnetized when said driving member is separated from said stator, and said housing being formed from a material having an intermediate permeability.

5. In a magnetic coupling, the combination comprising an elongated driven member having a group of magnetic pole extensions secured thereto adjacent each end of said member, a driving member having a group of magnetic pole extensions formed at each end thereof and juxtaposable with said driven members respectively, a magnet forming part of said driving member and having north and south magnetic poles joined respectively to said groups of driving member extensions, said magnet being formed from a magnetic material which will not become demagnetized when said driving member is separated from said driven member, and an enclosure disposed between said driving and driven member, said enclosure being formed from a material having an intermediate permeability.

References Cited in the file of this patent

UNITED STATES PATENTS

| | | |
|---|---|---|
| 1,911,960 | Lipman | May 30, 1933 |
| 2,334,153 | Wilson | Nov. 9, 1943 |
| 2,705,762 | Pile | Apr. 5, 1955 |
| 2,774,896 | Reynst | Dec. 18, 1956 |
| 2,779,885 | Reynst | Jan. 29, 1957 |

FOREIGN PATENTS

| | | |
|---|---|---|
| 65,594 | Switzerland | May 26, 1913 |
| 757,874 | Germany | Feb. 9, 1953 |
| 984,344 | France | Feb. 21, 1951 |